United States Patent
Cheng et al.

(10) Patent No.: US 11,504,914 B2
(45) Date of Patent: Nov. 22, 2022

(54) THERMAL CHARACTERISTIC CONTROL IN A BUILD MATERIAL

(71) Applicant: HEWLETT-PACKARD DEVELOPMENT COMPANY, L.P., Spring, TX (US)

(72) Inventors: Xin Cheng, Vancouver, WA (US); Vanessa Verzwyvelt, Vancouver, WA (US); Arthur H. Barnes, Vancouver, WA (US); Michael Crockett, Vancouver, WA (US); Jake Wright, San Diego, CA (US); Morgan T. Schramm, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 52 days.

(21) Appl. No.: 16/608,220

(22) PCT Filed: Jun. 4, 2018

(86) PCT No.: PCT/US2018/035823
§ 371 (c)(1),
(2) Date: Oct. 25, 2019

(87) PCT Pub. No.: WO2019/236050
PCT Pub. Date: Dec. 12, 2019

(65) Prior Publication Data
US 2021/0331412 A1 Oct. 28, 2021

(51) Int. Cl.
*B33Y 50/02* (2015.01)
*B29C 64/393* (2017.01)
*B29C 64/264* (2017.01)
*B29C 64/209* (2017.01)
*B33Y 10/00* (2015.01)
*B33Y 30/00* (2015.01)
*B29C 64/165* (2017.01)

(52) U.S. Cl.
CPC .......... *B29C 64/393* (2017.08); *B29C 64/209* (2017.08); *B29C 64/264* (2017.08); *B33Y 50/02* (2014.12); *B29C 64/165* (2017.08); *B33Y 10/00* (2014.12); *B33Y 30/00* (2014.12)

(58) Field of Classification Search
None
See application file for complete search history.

(56) References Cited

U.S. PATENT DOCUMENTS

| 9,662,840 B1 | 5/2017 | Buller et al. |
| 2005/0167872 A1* | 8/2005 | Tsubaki ................ B22C 23/00 264/308 |

(Continued)

FOREIGN PATENT DOCUMENTS

| CN | 104870322 | 8/2015 |
| DE | 102010041377 | 3/2012 |

(Continued)

*Primary Examiner* — Gary Collins
(74) *Attorney, Agent, or Firm* — Trop Pruner & Hu PC (57) ABSTRACT

A system determines an object part density relative to a build region in a layer of build material used in an additive manufacturing machine, the object part density based on a relative portion of the build region where an energy absorbing agent is applied. The system controls a thermal characteristic of the build region in the layer of build material based on the determined object part density.

19 Claims, 5 Drawing Sheets

(56) References Cited

U.S. PATENT DOCUMENTS

| | | |
|---|---|---|
| 2008/0100710 A1 | 5/2008 | Masumoto et al. |
| 2009/0086240 A1 | 4/2009 | Kim |
| 2013/0108726 A1 | 5/2013 | Uckelmann et al. |
| 2014/0117575 A1* | 5/2014 | Kemperle ............. B29C 64/393 |
| | | 264/40.7 |
| 2016/0004490 A1 | 1/2016 | Nagatani |
| 2017/0056970 A1 | 3/2017 | Chin et al. |
| 2017/0151722 A1 | 6/2017 | Prasad et al. |
| 2017/0239721 A1 | 8/2017 | Buller et al. |
| 2017/0341307 A1 | 11/2017 | Vilajosana et al. |
| 2018/0104897 A1* | 4/2018 | Novick ................. B29C 64/393 |
| 2020/0016822 A1* | 1/2020 | Levy ...................... B33Y 80/00 |

FOREIGN PATENT DOCUMENTS

| | | |
|---|---|---|
| EP | 3208077 A1 | 8/2017 |
| EP | 3271143 A | 1/2018 |
| WO | WO2001038061 A1 | 5/2001 |
| WO | WO2017054842 A1 | 4/2017 |
| WO | WO2017157476 A1 | 9/2017 |
| WO | WO-2017186278 A1 | 11/2017 |
| WO | WO2017194113 A1 | 11/2017 |
| WO | WO2017196339 A1 | 11/2017 |
| WO | WO2017196350 A1 | 11/2017 |
| WO | WO2019022700 A1 | 1/2019 |
| WO | WO2019070250 A1 | 4/2019 |

\* cited by examiner

THERMAL CHARACTERISTIC CONTROL IN A BUILD MATERIAL

BACKGROUND

Additive manufacturing machines produce three-dimensional (3D) objects by building up layers of material. A type of an additive manufacturing machine is referred to as a 3D printing system. Additive manufacturing machines are able to receive as input a computer aided design (CAD) model or other digital representation of a physical 3D object to be formed, and build, based on the CAD model, the physical 3D object. The model may be processed into layers by the additive manufacturing machine, and each layer defines a corresponding part (or parts) of the 3D object.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An additive manufacturing machine such as a three-dimensional (3D) printing system can build 3D objects by forming successive layers of build material and processing each layer of build material on a build platform. In some examples, a build material can include a powdered build material that is composed of particles in the form of fine powder or granules. The powdered build material can include metal particles, plastic particles, polymer particles, ceramic particles, or particles of other powder-like materials. In some examples, a build material powder may be formed from, or may include, short fibers that may, for example, have been cut into short lengths from long strands or threads of material.

As part of the processing of each layer of build material, agents can be dispensed (such as through a printhead or other liquid delivery mechanism) to the layer of build material. Examples of agents include a fusing agent (which is a form of an energy absorbing liquid) that absorbs the energy emitted from an energy source used in the additive manufacturing process. For example, after a layer of build material is deposited onto a build platform (or onto a partially formed 3D object) in the additive manufacturing machine, a fusing agent with a target pattern can be deposited on the layer of build material. The target pattern can be based on an object model (or more generally, a digital representation) of the physical 3D object that is to be built by the additive manufacturing machine.

According to an example, a fusing agent may be an ink-type formulation comprising carbon black, such as, for example, the fusing agent formulation commercially known as V1Q60Q "HP fusing agent" available from HP Inc. In an example a fusing agent may additionally comprise an infrared light absorber, a near infrared light absorber, a visible light absorber, or an ultraviolet (UV) light absorber.

Following the application of the fusing agent, an energy source (e.g., including a heating lamp or multiple heating lamps) is activated to sinter, melt, fuse, or otherwise coalesce the powder of the layer of build material underneath the fusing agent. The patterned build material layer (i.e., portions of the layer on which the fusing agent was deposited) can solidify and form a part, or a cross-section, of the physical 3D object.

Next, a new layer of powder is deposited on top of the 3D part that has been formed so far, and the process is re-iterated in the next additive manufacturing cycle.

In further examples, other types of additive manufacturing agents can be added to a layer of build material. For example, a detailing agent can be strategically deposited on portions of the layer of build material, which may also, in some examples, be based on the object model. The detailing agent may, for example, be provided to achieve a target surface quality and accuracy in forming a part. The detailing agent may also, in some examples, be used to provide cooling or thermal control to regions of the build material. In some examples, a detailing agent can include water. In more specific examples, a detailing agent may be a formulation commercially known as V1Q61A "HP detailing agent" available from HP Inc.

In additive manufacturing, it is desirable to precisely control the surface temperature of a part as it is being fabricated. Temperature variations (such as variations in temperature between different layers of build material) can cause undesirable build variations (that can lead to part defects). During the solidification process of a build material powder, non-uniform temperature distribution or unbalanced thermal stress can cause warping or otherwise affect the dimensional accuracy and material properties of the built part. For example, if the build material layer becomes too hot, thermal energy may bleed into the surrounding portions of the build material that is not intended to fuse and result in incorrect geometry, dimensions, and appearance. Additionally, the increased heat can undesirably affect the subsequent layer of build material with uncontrolled fusing. Alternatively, if the build material layer is too cold, the material properties can be inadequate in certain mechanical properties including ultimate tensile strength, elongation at break, and impact strength, for example.

A source of thermal variation between layers of build material can be attributed to irradiance variation resulting from incident energy reflection (e.g., heat reflection) and subsequent non-targeted (unwanted) energy absorption (e.g., heat absorption) in regions of a build material layer, in which reflections between the energy source and the layer of build material contributes to additional unintended heating of the areas of the build material layer. The energy source directs incident heat energy onto the layer of build material, which includes an area (or areas) where a fusing agent has been deposited, and a blank area (or areas) where a fusing agent has not been deposited. The incident heat energy is reflected from the blank area(s) (which includes build material powder having a white or light color, for example) back to the energy source, and the reflected heat energy is then reflected from a reflector (or reflectors) in the energy source back to the layer of build material.

The amount and distribution of non-targeted heat energy absorbed as a result of non-targeted heat energy reflections can vary depending on the object part density of the current layer. Object part density can refer to the percentage area of the current layer covered by a fusing agent. In a dense arrangement, the presence of a larger area of fusing agent causes a larger amount of energy to be absorbed by the fusing agent, which leads to less heat energy reflection from the surface of the layer of build material. On the other hand, in a sparser arrangement of part(s) in the layer of build material, a fusing agent applied onto a smaller area(s) of the layer of build material means that there would be a larger blank area(s) in the layer of build material. The larger blank area(s) can cause a greater amount of heat energy reflection, which increases non-targeted heat energy absorption and resulting irradiance variation.

In some examples, a control part(s) (also referred as a "sacrificial part(s)") can be formed in a control region in a layer of build material, which is separate from a build region of the layer of build material. The build region of the layer of build material is a region where a portion of a target 3D object is to be formed. The control region is away from the build region. In some examples, the control region is part of a boundary region around the edge of a build platform. The control region is provided due to thermal losses at the sides of the build platform. In other examples, the control region can be provided in any other region of the build platform. The control part(s) is (are) generated by the additive manufacturing machine, and not based on an object model that used for building a 3D object by the additive manufacturing machine. The control part(s) is (are) intended to be discarded once the additive manufacturing is complete. The thermal characteristic (e.g., temperature) of the top surface layer(s) of the control part(s) can be measured, for example, using a thermal camera or other imaging device, and used as feedback and applied to a controller that adjusts a power level supplied to the energy source. In some examples, the same control part(s) is (are) formed in each layer of build material. As a result, the thermal characteristic feedback based on the use of the same control part(s) in the control regions in different layers may not provide an accurate representation of a thermal characteristic in the build regions in the different layers, particularly if the build regions in the different layers have different object part densities.

An "object part density" represents a relative amount of a part (or collection of parts) to be formed in a build region of a layer of build material relative to the overall area of the build region. A part or collection of parts in a layer of build material is built by applying a fusing agent to the area or collection of areas corresponding to the part or collection of parts. The object part density can be expressed as a percentage of the area of the part (or collection of parts) relative to the area of the build region. Stated differently, an object part density includes a relative portion (e.g., expressed as a percentage) of the build region where an energy absorbing agent (e.g., fusing agent) is applied.

Note that the "build region" can refer to the total area of the layer of build material in which a part (or collection of parts) is to be formed. Alternatively, the "build region" can refer to a sub-region of the total area of the layer of build material.

In accordance with some implementations of the present disclosure, to achieve more accurate thermal control of a layer of build material, a system determines an object part density relative to a build region in the layer of build material used in an additive manufacturing machine. The system controls a thermal characteristic of the build region in the layer of build material based on the determined object part density.

The control of a thermal characteristic of a layer of build material can be performed using any of various different techniques, which are discussed below.

In some techniques, an object part density in a layer of build material is calculated based on an object model of a 3D object to be built by an additive manufacturing machine. If multiple objects are to be built, then multiple object models for the multiple objects can be provided to the additive manufacturing machine. The object part density is of the part(s) to be formed in a build region of the layer of build material. This object part density for the build region of the layer of build material is simulated with control part(s) formed in a control region. A thermal image of the control part(s) in the control region is used as feedback to control a thermal characteristic of the build region in the layer of build material.

Figure 1A:
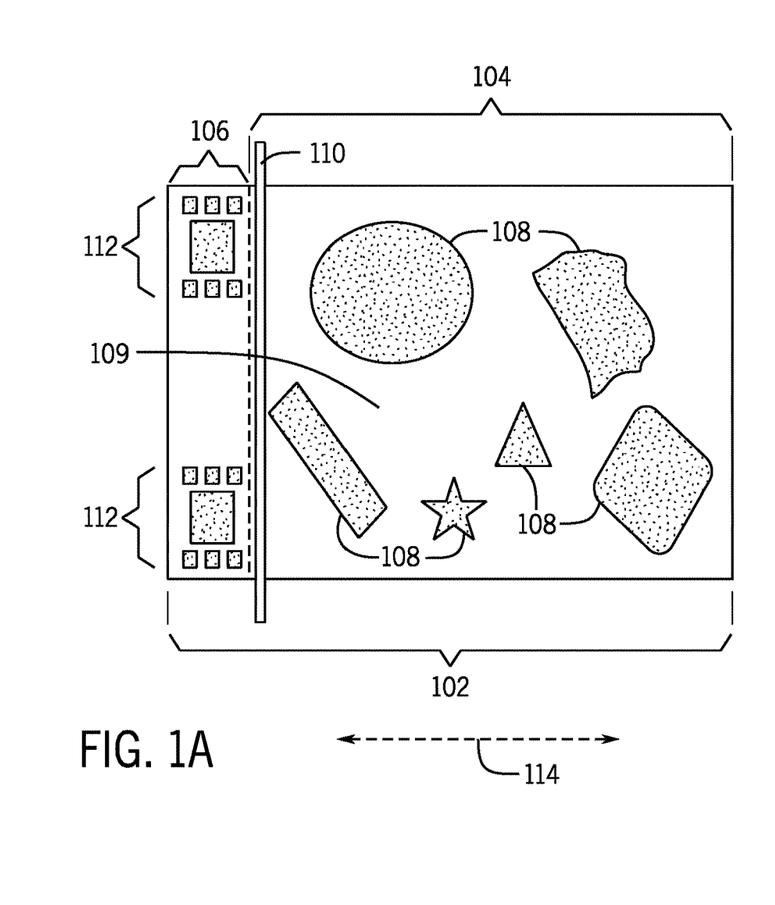
FIGS. 1A and 1B are examples of using control or sacrificial parts in control regions to control thermal characteristics of build regions in layers of build material, in accordance with some examples.
Figure 1B:
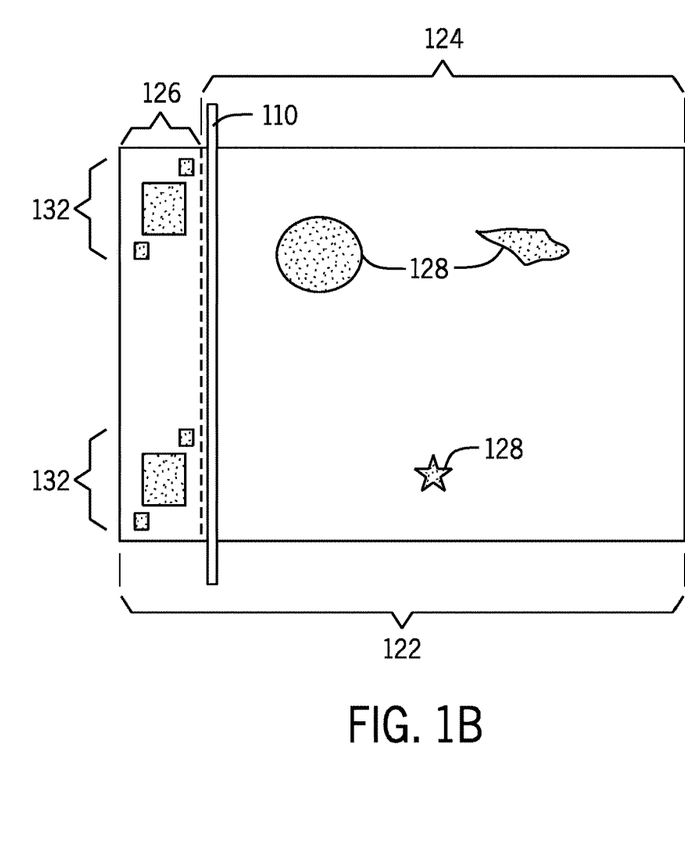

FIGS. 1A-1B show examples of using control parts in control regions to simulate object part densities in respective build regions of layers of build material. FIG. 1A is a top view of a build material layer 102. The build material layer 102 includes a build region 104 and a control region 106. The control region 106 can be part of a peripheral region of the build material layer 102 between the build region 104 and an edge or other boundary.

As shown in FIG. 1A, parts 108 of a 3D object (or 3D objects) to be built by an additive manufacturing machine are formed in the build region 104 of the build material layer 102. To form the parts 108, a fusing agent is applied to areas where the parts 108 are to be formed. The remaining portion of the build region 104 (the portion outside of the areas containing the parts 108) is considered a blank portion 109.

An energy source 110 (which can also be referred to as a "fusing module") is provided above the build material layer 102. The energy source 110 includes a heater (or multiple heaters) that when activated apply heat directed to the build material layer 102. For example, a heater can include an infrared heat lamp.

In some examples, the energy source 110 is movable across the build material layer 102 along an axis 114. In other examples, the energy source 110 can be movable across other axes. More generally, the energy source 110 is movable relative to the build material layer 102, where such relative movement can be accomplished by either moving the energy source 110 or moving a build platform on which the build material layer 102 is provided, or both.

In areas corresponding to the parts 108, a fusing agent would be present that absorbs energy from the energy source 110. In the blank portion 109 of the build material layer 102, energy from the energy source 110 is reflected from the blank portion 109. The reflected energy from the blank portion 109 can in turn be reflected by a reflector(s) used in the energy source 110 that re-directs the reflected energy back onto the build material layer 102. This re-directed reflected energy results in irradiance variation that contributes to additional unintended heating of the build material layer 102.

In accordance with some implementations of the present disclosure, control parts 112 are formed in the control region 106, where the control parts 106 has an object part density that simulates the object part density of the parts 108 in the build region 104. Forming the control parts 112 in the control region 106 includes dispensing a fusing agent to the areas of the control region 106 where the control parts 112 are to be formed, and applying energy from the energy source 110 to solidify the build material layer 102 portions under the areas of the control region 106 where the fusing agent is applied.

Thermal feedback based on thermal imaging (e.g., with a thermal sensor) the control parts 112 is used to adjust a thermal characteristic of the build region 104 of the build material layer 102. The adjustment of the thermal characteristic of the build region 104 of the build material layer 102 can be based on adjusting the electrical energy supplied to the energy source 110, or based on applying a cooling agent to the build material layer 104.

Increasing the electrical power to the energy source 110 (such as by increasing an applied voltage and/or an applied current) causes the energy source 110 to increase the amount of applied energy to the build material layer 102. In contrast, reducing the electrical power applied to the energy source 110 reduces the amount of energy applied by the energy source 110 to the build material layer 102. The adjustment of the energy of the energy source 110 is performed on a per build layer basis.

In some examples, a cooling agent can be a detailing agent, such as water. When the cooling agent is applied to a surface of the build material layer 102, the cooling agent evaporates. The evaporation by the cooling agent cools the portion of the build material layer 102 where the cooling agent is applied. Increasing an amount of cooling agent applied to the build material layer 102 can thus increase cooling of the build material layer 102.

FIG. 1B shows another build material layer 122 (which may be formed before or after the build material layer 102 of FIG. 1A) that includes a build region 124 and a control region 126. Parts 128 are to be formed in the build region 124. The object part density of the parts 128 in the build region 124 of the build material layer 122 is less than the object part density of the parts 108 in the build region 104 of the build material layer 102. In other words, the parts 108 in the build region 104 (FIG. 1A) are denser than the parts 128 in the build region 124 (FIG. 1B).

The object part density of control parts 132 formed in the control region 126 of the build material layer 122 of FIG. 1B is also less than the object part density of the control parts 112 formed in the control region 106 of the build material layer 102 of FIG. 1A. The object part density of the control parts 132 in the control region 126 of the build material layer 122 is to simulate the sparser object part density of the parts 128 in the build region 124, as determined based on the object model.

Figure 2:
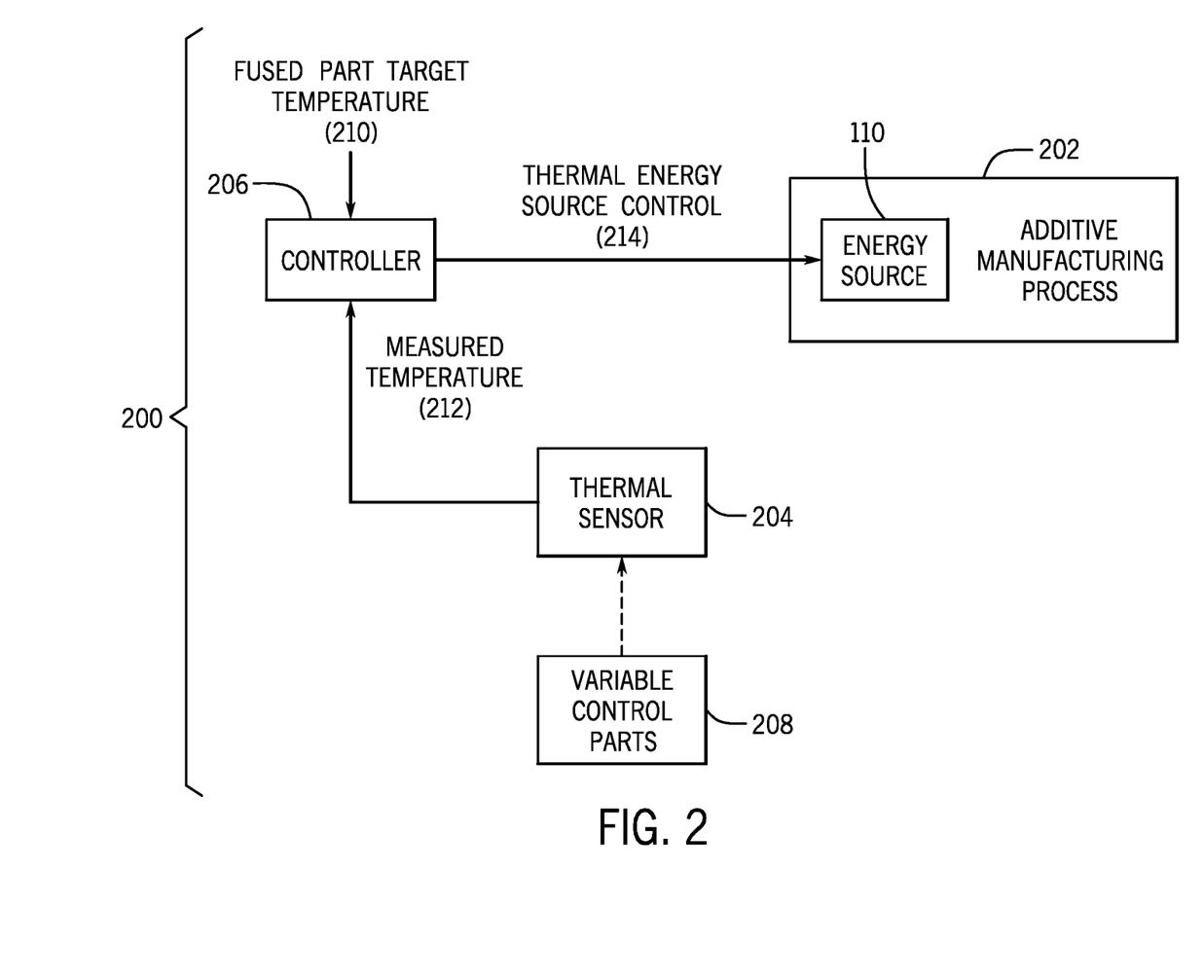
FIG. 2 is a block diagram of a closed loop control system according to some examples.

FIG. 2 is a block diagram of an example closed loop feedback arrangement 200 of an additive manufacturing machine, in accordance with some implementations of the present disclosure. The closed loop feedback system 200 includes an additive manufacturing process 202, a thermal sensor 204, and a controller 206. The additive manufacturing process 202 can include dispensing a layer of build material onto a build platform (or a partially formed 3D object), dispensing a fusing agent (and possibly other additive manufacturing agents), and applying thermal energy from the energy source 110. The additive manufacturing process 202 can form parts in a build region of a build material layer, and form control parts in a control region of the build material layer.

As discussed in conjunction with FIGS. 1A and 1B, the control parts formed in multiple different layers can have different object part densities that correspond to object part densities of parts formed in respective build regions of corresponding build material layers. Such control parts that can have different object part densities in different build material layers are referred to as "variable" control parts 208 in FIG. 2.

The controller 206 can be implemented as a hardware processing circuit, which can include any or some combination of the following: a microprocessor, a core of a multi-core microprocessor, a microcontroller, a programmable integrated circuit device, a programmable gate array, or another hardware processing circuit. Alternatively, the "controller" can be implemented as a combination of a hardware processing circuit and machine-readable instructions (software and/or firmware) executable on the hardware processing circuit.

In some examples, the controller 206 can include a proportional integral derivative (PID) controller.

A fused part target temperature 210 is input into the controller 206. The fused part target temperature 210 is the target temperature at which the parts in the build region of a build material layer are to be formed.

The thermal sensor 204 measures a thermal characteristic (e.g., a temperature) of the variable control parts 208 in the control region of the build material layer. Although reference is made to one thermal sensor 204, it is noted that there may be multiple thermal sensors 204 to measure the thermal characteristic of the variable control parts 208 in other examples.

The thermal sensor 204 outputs a measured thermal characteristic 212 to the controller 206. The measured thermal characteristic 212 (e.g., a measured temperature) can be indicative of a build temperature of the control region of the build material layer. The controller 206 uses the measured thermal characteristic 212 as feedback to control thermal energy delivery from the energy source 110. The control of the energy source 110 is accomplished by the controller 206 providing a thermal energy source control indication 214 (which can include a signal, a command, or any other information) to the energy source 110. The thermal energy source control indication 214 can control the amount of power delivered to the energy source 110, for example, which in turn controls the amount of energy directed by the energy source 110 to the build material layer.

In some examples, the controller 206 compares the measured temperature 212 from the thermal sensor 204 to the fused part target temperature 210. The adjustment of the energy source 110 is based on the comparison of the temperatures 212 and 210. For example, if the measured temperature 212 exceeds the fused part target temperature 210, then the controller 206 can adjust the thermal energy source control indication 214 to reduce the amount of power of the energy source 110. In contrast, if the measured temperature 212 is less than the fused part target temperature 210, then the controller 206 can adjust the thermal energy source control indication 214 to increase the amount of power of the energy source 110.

Figure 3:
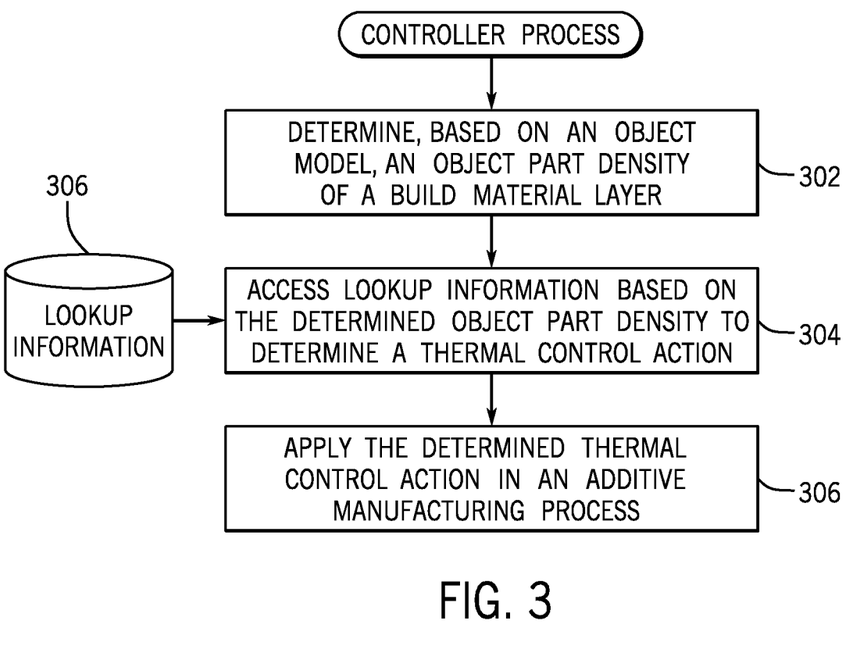
FIG. 3 is a flow diagram of a thermal layer thermal control process according to further examples.

FIG. 3 shows a process of controlling a thermal characteristic of a build material layer. The process of FIG. 3 can be performed by a controller, such as the controller 206 of FIG. 2 or a different controller.

The controller determines (at 302), based on an object model representing a 3D object to be built by an additive manufacturing machine, an object part density of a build material layer. The controller access (at 304) lookup information 306 based on the determined object part density to determine a thermal control action to take. The lookup information 306 can be in the form of a lookup table that maps different object part densities to corresponding different thermal control actions. For example, a lookup information 306 can include multiple entries, where each entry correlates a corresponding object part density to a respective thermal control action.

The controller then applies (at 306) the determined thermal control action in an additive manufacturing process.

The thermal control action can include adjusting a power of the energy source 110 used in the additive manufacturing process. Alternatively, the thermal control action can include adjusting an amount of a cooling agent. As yet another alternative, the thermal control action can include adjusting a power of the energy source 110 and adjusting the amount of a cooling agent.

Table 1 below illustrates an example lookup table that maps different object part densities of a build material layer to respective fusing power adjustments and cooling agent adjustments.

TABLE 1

| Object Part Density in Layer (%) | Fusing Power Adjustment (% increase) | Cooling Agent Adjustment (%) |
|---|---|---|
| 0 | 0.0 | 30 |
| 5 | 2.7 | 20 |
| 10 | 5.3 | 10 |
| 15 | 8.0 | 0 |
| 20 | 10.6 | −6 |
| 25 | 13.3 | −12 |
| 30 | 15.9 | −18 |
| 35 | 18.6 | −24 |
| 40 | 21.2 | −30 |
| 45 | 23.9 | −36 |
| 50 | 26.5 | −42 |
| 55 | 29.2 | −48 |
| 60 | 31.8 | −54 |
| 65 | 34.5 | −60 |
| 70 | 37.1 | −66 |
| 75 | 39.8 | −72 |
| 80 | 42.4 | −78 |
| 85 | 45.1 | −84 |
| 90 | 47.7 | −90 |
| 95 | 50.4 | −96 |
| 100 | 53.0 | −100 |

Although the above example lookup table correlates object part densities to both fusing power adjustments and cooling agent adjustments, it is noted that in other examples, object part densities can be mapped by the lookup table to just power adjustments or just cooling agent adjustments.

The object part density is expressed as a percentage of the overall area of a build region in which a part (or parts) is (are) to be formed (i.e., the area(s) where a fusing agent is to be applied).

The fusing power adjustment of the lookup table indicates the percentage increase in the amount of fusing power to be applied to the thermal energy source when fusing the build material layer. For example, in the first entry of the lookup table, if there are no parts to be formed in the build material layer (0% object part density), then the fusing power adjustment is 0%. However, in the second entry, if the object part density is 5%, then the fusing power adjustment is a 2.7% increase (as compared to the scenario of 0% object part density).

More generally, the fusing power adjustment is an example of an energy control value that controls an amount of energy output by the energy source 110. The controller obtains an energy control value based on the determined object part density, such as from the lookup table, and adjusts the energy output by the energy source based on the energy control value.

Similarly, if the object part density is 0%, then the cooling agent adjustment is 30% (which means that a 30% increase in cooling agent is applied to the build material layer as compared to the scenario where the object part density is 15%). On the other hand, if the object part density is 20%, then the cooling agent adjustment is −6% (which means that the amount of cooling agent applied to the build material layer is decreased by 6% as compared to the scenario where the object part density is 15%).

More generally, the cooling agent adjustment is an example of a cooling control value that determines an amount of cooling agent to apply in response to a determined object part density.

Although example percentages are included in the lookup table, it is noted that in other examples, different amounts can be included in the lookup table.

In other examples, instead of accessing the lookup information 306 to determine the thermal interaction to take, the controller can apply an algorithm, such as a formula, a machine learning model, and so forth, that produces a thermal control action to take (e.g., adjusting a fusing thermal energy source and/or adjusting an amount of cooling agent) based on a determined object part density. For example, the controller can compute, using the algorithm, the energy control value or cooling control value based on the determined object part density.

Figure 4:
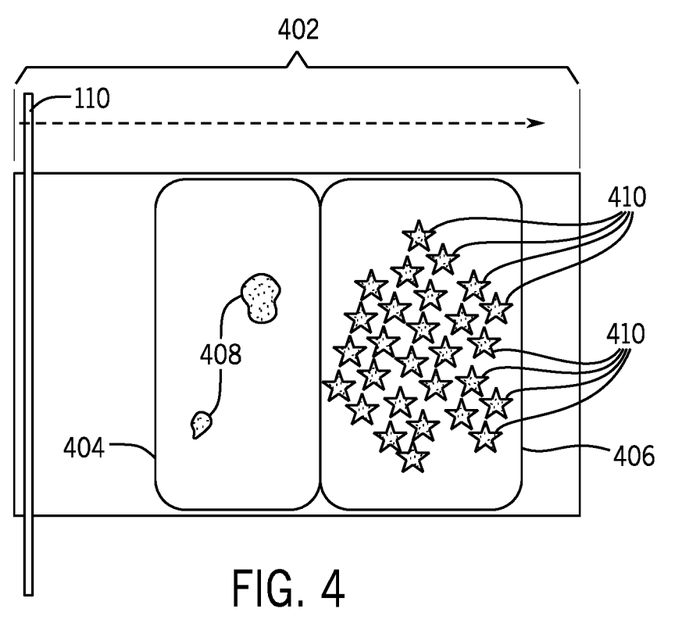
FIG. 4 illustrates an example of performing thermal control in respective regions of a layer of build material according to additional examples.

FIG. 4 is a block diagram showing another technique of performing thermal control of a build material layer 402. The build material layer 402 is divided into multiple different regions 404 and 406. Although just two regions are shown in FIG. 4, it is noted that in other examples, the build material layer 402 can be divided into more than two build regions. In the example of FIG. 4, the build region 404 is a sparse region, and the build region 406 is a dense region. The sparse region 404 includes a sparse arrangement of parts 408, while the dense region 406 includes a dense arrangement of parts 410.

Thermal control can be applied to each build region 404 or 406 independently of another build region, such as based on using the technique of FIG. 3. For example, when performing fusing in the build region 404, a controller can determine the object part density of the build region 404 (based on an object model), and can control the thermal characteristic of the build region 404 based on the determined object part density, either by controlling the thermal energy source or by adjusting the amount of a cooling agent applied to the build region 404.

Similarly, the controller can independently control the thermal characteristic of the build region 406 when performing fusing in the build region 406, based on a determined object part density of the build region 406.

Figure 5:
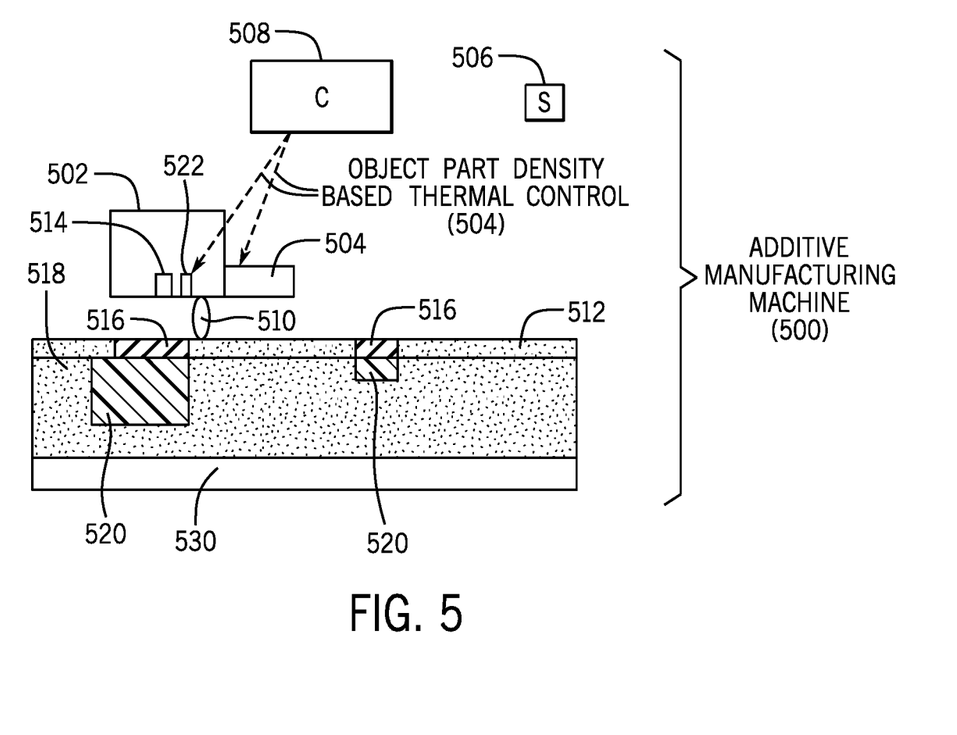
FIG. 5 is a block diagram of an additive manufacturing machine according to further examples.

FIG. 5 is a schematic side view of an example additive manufacturing machine 500 according to some examples. The additive manufacturing machine 500 includes a dispensing assembly 502, an energy source 504, a thermal sensor 506, and a controller 508. The dispensing assembly 502 can include a build material spreader 510 to dispense and spread a build material layer 512, and a fusing agent dispenser 514 to dispense fusing agent 516 on a build surface 518.

The build material spreader 510 can include a wiper or a re-coater roller, for example, to spread a dispensed build material layer 512 over build surface 518. The fusing agent dispenser 514 can include a printhead, for example. The build surface 518 can be a build platform 530 or a previously formed layer of build material, for example. After the build material spreader 510 forms the build material layer 512, the fusing agent dispenser 514 selectively dispenses the fusing agent 516 onto the newly formed build material layer 512. The energy source 504 is activated to heat and fuse the portion of the build material layer 512 on which the fusing agent 516 has been applied to form a layer of a 3D build object 520.

In some examples, the dispensing assembly 502 and energy source 504 can be mounted to a carriage (not shown) that can be movable across the build surface 518 in one direction, or in multiple directions.

The dispensing assembly 502 further includes a cooling agent dispenser 522 that dispenses a cooling agent (e.g., a detailing agent) onto the surface of the build material layer 512.

In accordance with some examples of the present disclosure, the controller 508 can apply an object part density based thermal control (524) of the build material layer 512, by controlling the power of the energy source 504 and/or the amount and/or location of cooling agent dispensed by the cooling agent dispenser 522 based on a determined object part density of parts to be formed in the build material layer 512. The location(s) at which the cooling agent is dispensed by the cooling agent dispenser onto the build material layer 512 is based on an identification, by the controller 508, of which location(s) of the build material layer 512 is (are) to be cooled.

Figure 6:
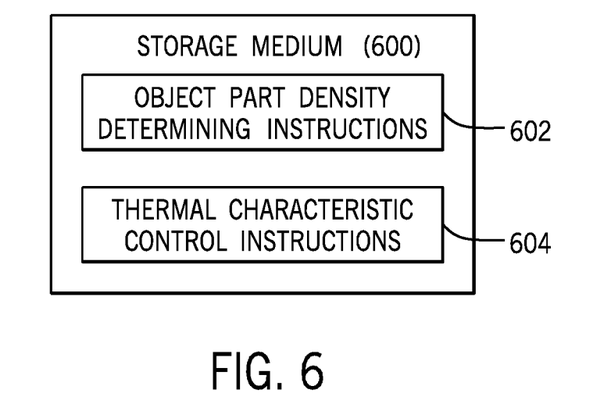
FIG. 6 is a block diagram of a storage medium storing machine-readable instructions according to some examples.

FIG. 6 is a block diagram of a non-transitory machine-readable or computer-readable storage medium 600 storing machine-readable instructions that upon execution cause a system to perform various tasks. The machine-readable instructions include object part density determining instructions 602 to determine an object part density relative to a build region in a layer of build material used in an additive manufacturing machine, the object part density based on a relative portion of the build region where an energy absorbing agent is applied. The machine-readable instructions further include thermal characteristic control instructions 604 to control a thermal characteristic (e.g., such as by adjusting an energy source and/or controlling an amount and/or location of a cooling agent dispensed onto the layer of build material) of the build region in the layer of build material based on the determined object part density.

Figure 7:
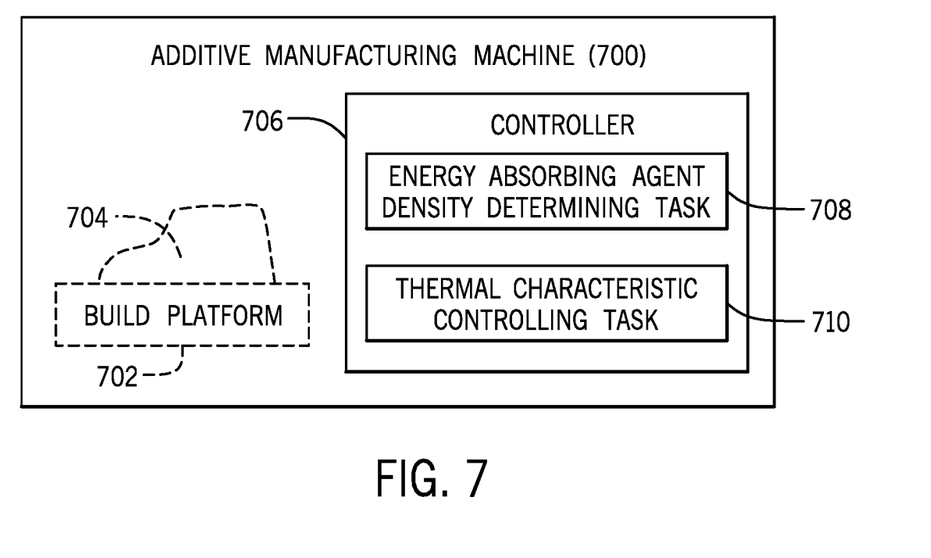
FIG. 7 is a block diagram of an additive manufacturing machine according to some examples.

FIG. 7 is a block diagram of an additive manufacturing machine 700. In some examples, the additive manufacturing machine 700 includes a build platform 702 on which a 3D object 704 is to be formed. In other examples, the additive manufacturing machine 700 can be initially built without the build platform 702, with the build platform added at a later stage, such as by a user or another entity.

The additive manufacturing machine 700 further includes a controller 706 to perform various tasks. The tasks of the controller 706 include an energy absorbing agent density determining task 708 that determines a density of an energy absorbing agent relative to a build region in a layer of build material used to form a portion of the 3D object 704. The tasks further include a thermal characteristic controlling task 710 to control a thermal characteristic (e.g., such as by adjusting an energy source and/or controlling an amount and/or location of a cooling agent dispensed onto the layer of build material) of the build region in the layer of build material based on the determined density of the energy absorbing agent.

Figure 8:
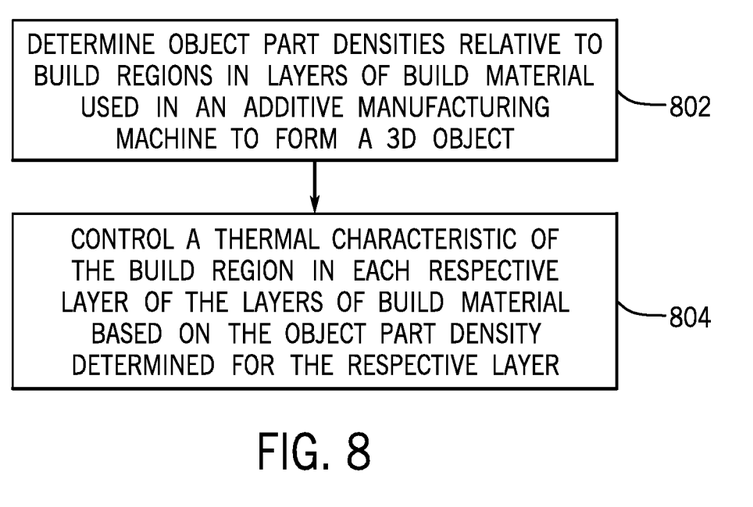
FIG. 8 is a flow diagram of a process of using a cooling agent for thermal control of the layer of build material, according to alternative examples.

FIG. 8 is a flow diagram of a process according to some examples, which can be performed by a controller. The process of FIG. 8 includes determining (at 802) object part densities relative to build regions in layers of build material used in an additive manufacturing machine to form a 3D object.

The process further includes controlling (at 804) a thermal characteristic (e.g., such as by adjusting an energy source and/or controlling an amount and/or location of a cooling agent dispensed onto the layer of build material) of the build region in each respective layer of the layers of build material based on the object part density determined for the respective layer.

The storage medium 600 of FIG. 6 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site (e.g., a cloud) from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a system to:
   determine an object part density relative to a build region in a layer of build material used in an additive manufacturing machine, the object part density based on a relative portion of the build region where an energy absorbing agent is applied; and
   control a thermal characteristic of the build region in the layer of build material based on the determined object part density, wherein the controlling of the thermal characteristic of the layer comprises controlling an energy source, and wherein the controlling of the energy source comprises:
   obtaining, based on the determined object part density, an energy control value that controls an amount of energy output by the energy source; and
   adjusting the energy output by the energy source based on the energy control value.

2. The non-transitory machine-readable storage medium of claim 1, wherein the controlling of the energy source comprises controlling a heater based on the determined object part density.

3. The non-transitory machine-readable storage medium of claim 1, wherein the obtaining of the energy control value comprises accessing lookup information that correlates different object part densities to corresponding different energy control values.

4. The non-transitory machine-readable storage medium of claim 1, wherein the obtaining of the energy control value comprises computing the energy control value based on the determined object part density.

5. The non-transitory machine-readable storage medium of claim 1, wherein the instructions upon execution cause the system to:
   determine respective object part densities of corresponding build regions in the layer of build material; and
   independently control thermal characteristics of the corresponding build regions based on the respective object part densities of the corresponding build regions.

6. The non-transitory machine-readable storage medium of claim 1, wherein the instructions upon execution cause the system to:
   control dispensing of a cooling agent to the build region in the layer of build material based on the determined object part density, to control the thermal characteristic of the build region in the layer of build material.

7. The non-transitory machine-readable storage medium of claim 1, wherein the instructions upon execution cause the system to:
   determine respective object part densities of corresponding build regions in the layer of build material; and
   independently control, based on the respective object part densities, dispensing of respective amounts of a cooling agent to the corresponding build regions of the layer of build material.

8. A non-transitory machine-readable storage medium storing instructions that upon execution cause a system to:
   determine an object part density relative to a build region in a layer of build material used in an additive manufacturing machine, the object part density based on a relative portion of the build region where an energy absorbing agent is applied; and
   control a thermal characteristic of the build region in the layer of build material based on the determined object part density, wherein the controlling of the thermal characteristic of the layer comprises controlling an energy source, and wherein the controlling of the energy source comprises:
   causing a formation of at least one control part that is based on the object part density;
   determining a thermal characteristic of the at least one control part; and
   adjusting an energy output by the energy source based on the determined thermal characteristic.

9. The non-transitory machine-readable storage medium of claim 8, wherein the controlling of the energy source comprises:
   obtaining an energy control value based on the determined thermal characteristic; and
   adjust the energy output by the energy source based on the energy control value.

10. The non-transitory machine-readable storage medium of claim 8, wherein the at least one control part is formed in a control region of the layer of build material, the control region separate from the build region.

11. The non-transitory machine-readable storage medium of claim 8, wherein the instructions upon execution cause the system to:
   control dispensing of a cooling agent to the build region in the layer of build material based on the determined object part density, to control the thermal characteristic of the build region in the layer of build material.

12. An additive manufacturing machine comprising:
   a controller to:
      determine a density of an energy absorbing agent relative to a build region in a layer of build material used to form a portion of a three-dimensional (3D) object, and
      control a thermal characteristic of the build region in the layer of build material based on the determined density of the energy absorbing agent; and
   a dispenser to deposit an amount of the energy absorbing agent in a control region in the layer of build material, the control region separate from the build region, the amount of the energy absorbing agent deposited in the control region based on the determined density of the energy absorbing agent in the build region,
   the controller to control the thermal characteristic of the build region based on a thermal characteristic of the amount of the energy absorbing agent in the control region.

13. The additive manufacturing machine of claim 12, further comprising:
   a further dispenser to deposit a cooling agent,
   wherein the controller is to control the further dispenser to deposit an amount of the cooling agent onto the layer of build material based on the determined density of the energy absorbing agent.

14. The additive manufacturing machine of claim 12, further comprising an energy source,
   the controller to control an energy output of the energy source to control the thermal characteristic of the build region in the layer of build material.

15. The additive manufacturing machine of claim 14, wherein the energy source comprises a heater.

16. A method comprising:
   determining, by a controller, object part densities relative to build regions in layers of build material used in an additive manufacturing machine to form a three-dimensional (3D) object; and
   controlling a thermal characteristic of the build region in each respective layer of the layers of build material based on the object part density determined for the respective layer, wherein the controlling of the thermal characteristic comprises adjusting an energy source that comprises:
      causing a formation of at least one control part that is based on the object part density determined for the respective layer, and
      determining a thermal characteristic of the at least one control part, and adjusting an energy output by the energy source based on the determined thermal characteristic.

17. The method of claim 16, wherein the control part is formed in a control region of the respective layer.

18. The method of claim 17, wherein the control region is separate from the build region.

19. The method of claim 16, wherein the adjusting of the energy output by the energy source comprises adjusting an energy output by a heater.

* * * * *